(12) United States Patent
Esser

(10) Patent No.: US 6,520,213 B1
(45) Date of Patent: Feb. 18, 2003

(54) ARCUATE DOUBLE-LAYER PIPE, AND METHOD OF ASSEMBLING AN ARCUATE DOUBLE-LAYER PIPE

(75) Inventor: Alexander Esser, Warstein (DE)

(73) Assignee: Esser-Werke KG, Warstein (DE)

( * ) Notice: Subject to any disclaimer, the term of this patent is extended or adjusted under 35 U.S.C. 154(b) by 0 days.

(21) Appl. No.: 10/213,118

(22) Filed: Aug. 6, 2002

(51) Int. Cl.[7] .................................................. F16L 9/04
(52) U.S. Cl. ...................... 138/109; 138/172; 138/177; 285/416; 285/55
(58) Field of Search ................................. 138/109, 114, 138/155, 143, 172, 177, 174, 178; 285/55, 286, 416, 16, 179

(56) References Cited

U.S. PATENT DOCUMENTS

| | | | |
|---|---|---|---|
| 5,275,440 A | | 1/1994 | Esser .......................... 285/16 |
| 5,379,805 A | * | 1/1995 | Klemm et al. .............. 138/109 |
| 5,718,461 A | * | 2/1998 | Esser .......................... 285/179 |
| 5,813,437 A | * | 9/1998 | Esser .......................... 138/109 |
| 5,984,374 A | * | 11/1999 | Esser .......................... 285/179 |
| 2002/0005222 A1 | * | 1/2002 | Esser | |

* cited by examiner

Primary Examiner—Patrick Brinson
(74) Attorney, Agent, or Firm—Henry M. Feiereisen

(57) ABSTRACT

An arcuate double-layer pipe for a pipeline for fluidic transport of abrasive solids, includes an inner pipe portion made of wear-resistant material, and an outer pipe portion of weldable steel in surrounding relationship to the inner pipe portion. A pair of coupling collars made of weldable steel is placed on opposite ends of the inner pipe portion, with each coupling collar having a ring-shaped insert of wear-resistant material and a rim-like projection so that the inner pipe portion extends between the ring-shaped inserts in the coupling collars and is overlapped on the opposite ends by the rim-like projections of the coupling collars. The rim-like projections of the coupling collars engage interiorly into opposite ends of the outer pipe portion for centering the outer pipe portion, with the opposite ends of the outer pipe portion being welded to the coupling collars.

16 Claims, 2 Drawing Sheets

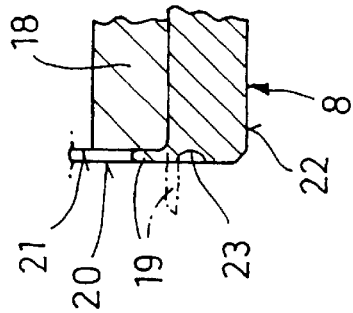
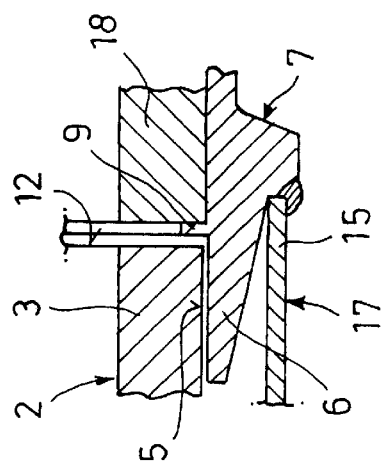
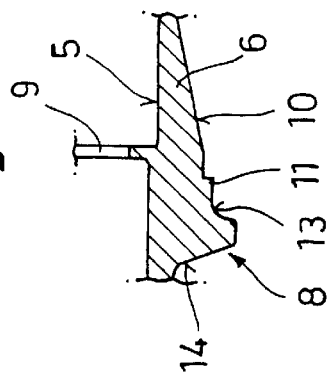
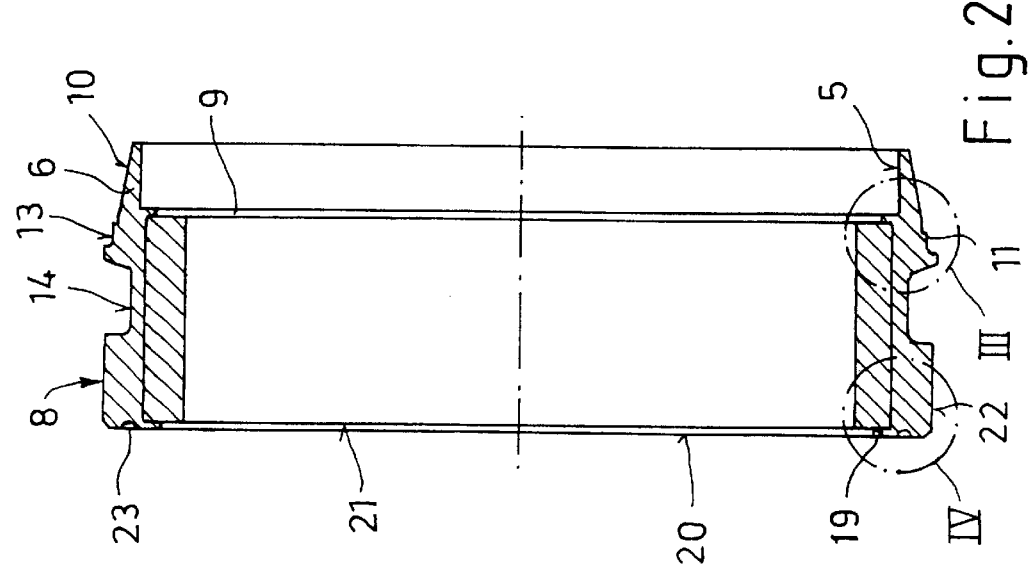

ARCUATE DOUBLE-LAYER PIPE, AND METHOD OF ASSEMBLING AN ARCUATE DOUBLE-LAYER PIPE

CROSS-REFERENCES TO RELATED APPLICATIONS

This application claims the priority of German Patent Application, Serial No. 101 43 290.9, filed Sep. 4, 2001, pursuant to 35 U.S.C. 119(a)–(d), the subject matter of which is incorporated herein by reference.

BACKGROUND OF THE INVENTION

The present invention relates, in general, to an arcuate double-layer pipe for a pipeline for fluidic transport of abrasive solids, such as concrete.

U.S. Pat. No. 5,275,440 describes a double-layer pipe bend which includes an inner pipe portion of cast steel, an outer pipe portion made of weldable steel and surrounding the inner pipe, and connecting flanges at the ends of the pipe bend.

Apart from problems arising during use and achieving of a long service life, fabrication and assembly of an arcuate double-layer pipe poses great challenges to the manufacturer. Although the fabrication of an arcuate pipe portion of highly wear-resistant material can fairly easily be realized, the integration of such a pipe portion in pipe bends of weldable steel for producing operational arcuate double-layer pipes still poses a problem because the inner pipe portion of highly wear-resistant material represents a delicate component and cannot be welded. Moreover, manufacturing-based tolerances of such inner pipe portions must be taken into account.

It would therefore be desirable and advantageous to provide an improved arcuate double-layer pipe for a pipeline for fluidic transport of abrasive solids, which obviates prior art shortcomings and which is simple in structure and can easily and economically be installed while still being reliable in operation.

SUMMARY OF THE INVENTION

According to one aspect of the present invention, an arcuate double-layer pipe for a pipeline for fluidic transport of abrasive solids, includes an inner pipe portion made of wear-resistant material; an outer pipe portion of weldable steel in surrounding relationship to the inner pipe portion; and a pair of coupling collars made of weldable steel and placed on opposite ends of the inner pipe portion, with each coupling collar having a ring-shaped insert of wear-resistant material and a rim-like projection so that the inner pipe portion extends between the ring-shaped insert of one coupling collar and the ring-shaped insert of the other coupling collar and is overlapped on the opposite ends by the rim-like projections of the coupling collars, wherein the rim-like projections of the coupling collars engage interiorly into opposite ends of the outer pipe portion for centering the outer pipe portion, with the opposite ends of the outer pipe portion being welded to the coupling collars.

The present invention resolves prior art problems by providing the coupling collars with rim-like projections which are constructed on the inside such that the ends of the inner pipe portion can be reliably received. The end faces of the inner pipe portion are then arranged in confronting disposition with respect to the ring-shaped inserts in the coupling collars. The projections are able to engage into the ends of the outer pipe portion for centering purposes to thereby comply reliably with the manufacturing-based tolerances of the inner pipe portion. Except for the welded joints between the coupling collars and the ends of the outer pipe portion, the assembly of the double-layer pipe involves only pure jointing and latching connections.

According to another feature of the present invention, the projections may also have a conical outer circumference. In this way, assembly of the outer pipe portion with the projections of the coupling collars is facilitated. Of course, it is also conceivable to conform the comparably thin outer pipe portion to the cylindrical projections through application of a respective shaping process, e.g. pressing.

According to another feature of the present invention, each of the coupling collars is provided in the area of the projection with a radially inwardly directed stop surface. This further facilitates the assembly of a double-layer pipe. The stop surfaces may be constructed as a continuous surface or in the form of spaced-apart lugs.

According to another feature of the present invention, each of the coupling collars has an inner pipe portion distal end face and may be provided at the inner pipe portion distal end face with a radially inwardly directed restraining surface. The provision of the stop surface and the restraining surface enables to carry out the welding operations for connecting the outer pipe portion to the coupling collars, and subsequently to join the ring-shaped inserts in the coupling collars. In this way, wearing properties, in particular of hardened inserts, are not adversely affected. The restraining surface may be designed during fabrication of the coupling collars as axial projection, either as continuous member extending about the circumference or formed as individual tabs in spaced-apart circumferential disposition. Once the inserts are joined in the coupling collars and abut against the respective stop surfaces, it is only necessary to bend the restraining tabs inwardly against the inserts to correctly position the inserts. Of course, it is also possible, to place the inserts first in the coupling collars and then weld the projections to the outer pipe portion.

According to another feature of the present invention, the end face of each of the coupling collars may be grooved between the restraining tabs and an outer surface of the coupling collar. The provision of the groove facilitates a bending of the tabs, especially when the restraining surface is continuous.

According to another feature of the present invention, the outer pipe portion may have a wall which is traversed by at least one opening, e.g. a bore. In this way, a supporting material may be introduced through the opening into the gap between the outer pipe portion and the inner pipe portion to better prop up the inner pipe portion which is sensitive to impact and shock.

The coupling collars may be provided with radially projecting flanges formed with bores for receiving bolts. The coupling collars may, however, also be provided with circumferential coupling grooves, especially of trapezoidal cross section for engagement of cup-shaped coupling members.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 2 is a vertical longitudinal section, on an enlarged scale, of a coupling collar with incorporated insert;

FIG. 3 is an enlarged detailed view of the area encircled in FIG. 2 and marked III;

FIG. 4 is an enlarged detailed view of the area encircled in FIG. 2 and marked IV; and FIG. 5 is an enlarged detailed view of the area encircled in FIG. 1 and marked V.

DETAILED DESCRIPTION OF PREFERRED EMBODIMENTS

Figure 1:
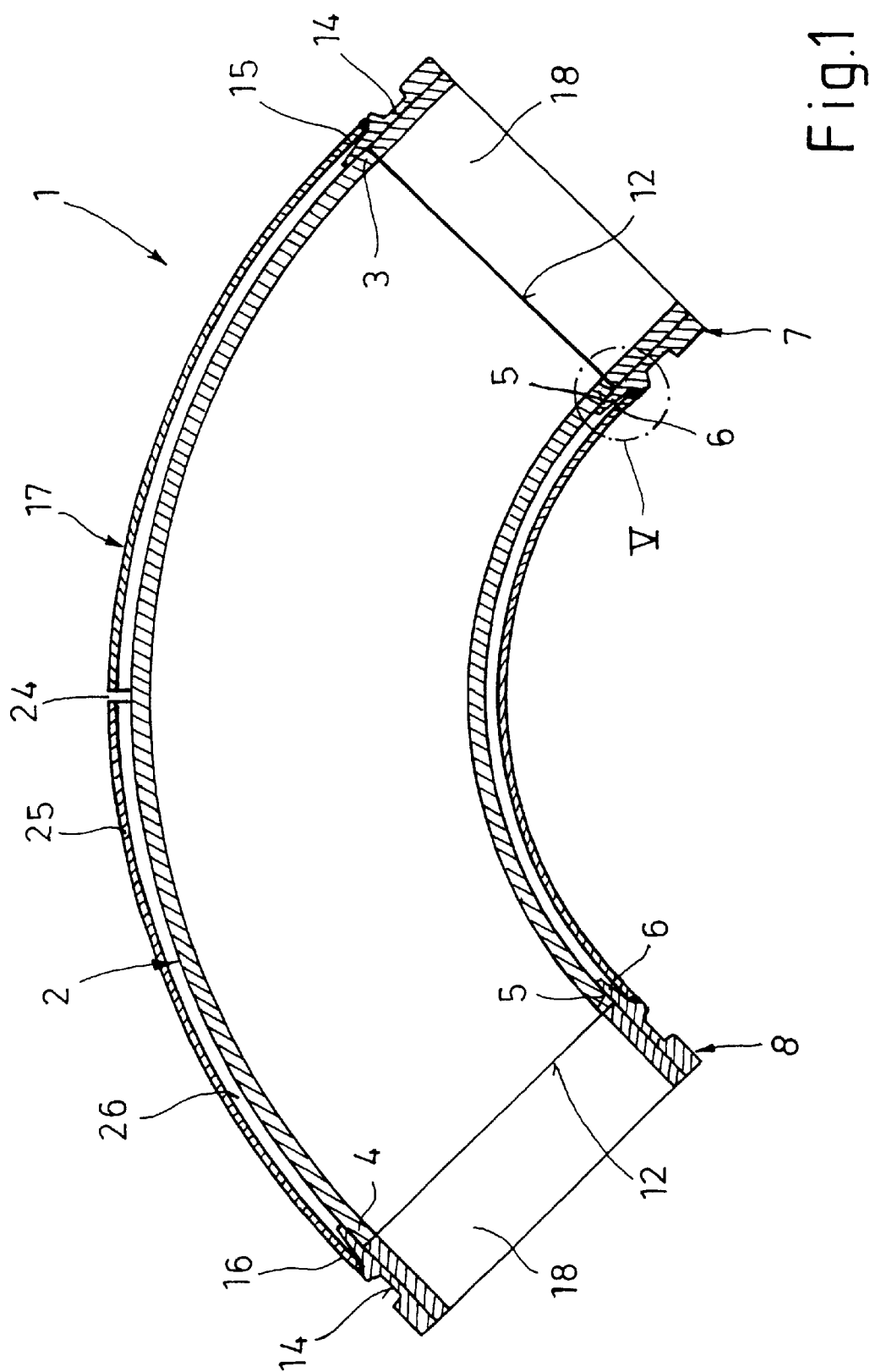
FIG. 1 is a vertical longitudinal section of an arcuate double-layer pipe according to the present invention.

Throughout all the Figures, same or corresponding elements are generally indicated by same reference numerals.

Turning now to the drawing, and in particular to FIG. 1, there is shown a vertical longitudinal section of an arcuate double-layer pipe according to the present invention, generally designated by reference numeral 1, for use in a pipeline for fluidic transport of concrete. The double-layer pipe 1 includes an inner pipe portion 1 made of highly wear-resistant material, e.g. cast steel. The inner pipe portion 2 has opposite pipe ends 3, 4 to engage, with play, in inner cylindrical length zones 5 of rim-like projections 6 of coupling collars 7, 8 made of weldable steel. There is no added securement between the pipe ends 3, 4 of the inner pipe portion 2 and the projections 6 of the coupling collars 7, 8, as shown in particular in FIG. 5.

As shown in FIGS. 2, 3 and 5, the coupling collars 7, 8 have each a stop surface 9 which is directed radially inwards. The inside stop surface 9 may be continuous to form a wrap-around ring, or may be formed by individual lugs in spaced-apart disposition about the circumference. On the outside, each projection 6 has a tapered surface 10, which ends at a shoulder 11 for abutment against the end face 12 of the inner pipe portion 2, when the double-layer pipe 1 is assembled. Formed adjacent the shoulder 11 is a trough-like rounded circumferential groove 13. As further shown in FIG. 3, the projection 6 of the each of the coupling collars 7, 8 has a circumferential coupling groove 14 of trapezoidal cross section.

The rim-like projections 6 of the coupling collars 7, 8 engage in opposite pipe ends 15, 16 of an outer pipe portion 17, made of weldable steel, as shown in particular in FIG. 5. The pipe ends 15, 16 of the outer pipe portion 17 slide across the tapered surfaces 10 of the projections 6 until abutting against the shoulders 11. Thereafter, the pipe ends 15, 16 are welded in the area of the circumferential grooves 13 to the coupling collars 7, 8. The outer pipe portion 17 has a wall thickness which, as shown in FIGS. 1 and 5, is significantly smaller, e.g. by about ⅔, than the wall thickness of the inner pipe portion 2.

Disposed inside each of the coupling collars 7, 8 is a ring-shaped insert 18 made of highly wear-resistant material, e.g. cast steel. The securement of the inserts 18 in the coupling collars 7, 8 is realized by a restraining surface 19, which, as best seen in FIG. 4, is provided at a projection-distal end face 20 of the coupling collars 7, 8. The restraining surface 19 may be formed by a continuous ring-shaped member or by plural restraining tabs in spaced-apart disposition about the circumference of the end face 20. Initially, after production of the coupling collars 7, 8, the restraining surface 19 juts out in axial direction, as shown by way of phantom line in FIG. 4. Once the inserts 18 are placed in the coupling collars 7, 8 in abutment against the stop surface 9, the restraining surface 19 of each coupling collar 7, 8 is bent inwards until resting against the end face 21 of the insert 18. As a consequence, the inserts 18 are secured in place in the coupling collars 7, 8 between the stop surface 9 and the restraining surface 19.

Assembly of the double-layer pipe 1 is as follows: One of the coupling collars 7, 8, for example coupling collar 7, is placed with its projection 6 into the pipe end 15 of the outer pipe portion 17 and then welded to the pipe end 15 of the outer pipe portion 17. Subsequently, the inner pipe portion 2 is inserted into the outer pipe portion 17 until abutting against the stop surface 9 in the cylindrical length zone 5 of the projection 6 of the coupling collar 7. The other coupling collar 8 with its projection 6 is then placed into the pipe end 16 of the outer pipe portion 17 such as to overlap the pipe end 4 of the inner pipe portion 2 and until the end face of pipe end 16 of the outer pipe portion 17 abuts against the shoulder 11 of the coupling collar 8. The pipe end 16 of the outer pipe portion 17 is then welded to the coupling collar 8.

After joining the inner pipe portion 2 and the outer pipe portion 17 in the manner described, the inserts 18 are placed into the coupling collars 7, 8 until abutting against the respective stop surface 9 of the coupling collars 7, 8, and the restraining surface 19 is bent from the axial manufacturing position into the radial securement position. Bending of the restraining surface 19 is facilitated by forming a groove 23 in the end face 20 of each coupling collar 7, 8 between the restraining surface 19 and the outer surface 22 of the coupling collar 7, 8, as best seen in FIG. 4.

An alternative mode of assembly involves a pre-fabrication of each coupling collar 7, 8 with the insert 18 to form a unitary structure. After placing the inner pipe portion 2 between the coupling collars 7, 8 with the inserts 18, the pipe ends 15, 16 of the outer pipe portion 17 is welded to the coupling collars 7, 8, as described above.

Referring back to FIG. 1, it can be seen that the outer pipe portion 17 has a wall 25 which is provided with at least one opening 24 for allowing introduction of a pressure compensating layer into a gap 26 defined between the inner pipe portion 2 and the outer pipe portion 17. Through incorporation of the pressure compensating layer, the inner pipe portion 2 can be disposed in flat engagement upon the outer pipe portion 17.

While the invention has been illustrated and described as embodied in an arcuate double-layer pipe, and method of assembling an arcuate double-layer pipe, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

1. An arcuate double-layer pipe for a pipeline for fluidic transport of abrasive solids, comprising:
   an inner pipe portion made of wear-resistant material;
   an outer pipe portion of weldable steel in surrounding relationship to the inner pipe portion; and
   a pair of coupling collars made of weldable steel and placed on opposite ends of the inner pipe portion, with each coupling collar having a ring-shaped insert of wear-resistant material and a rim-like projection so that the inner pipe portion extends between the ring-shaped insert of one coupling collar and the ring-shaped insert of the other coupling collar and is overlapped on the opposite ends by the rim-like projections of the coupling collars, wherein the rim-like projections of the coupling collars engage interiorly into opposite ends of the outer pipe portion for centering the outer pipe portion, with the opposite ends of the outer pipe portion being welded to the coupling collars.

2. The pipe of claim 1, wherein each of the projections has a tapered outer surface.

3. The pipe of claim 1, wherein each of the coupling collars is provided in the area of the projection with a radially inwardly directed stop surface.

4. The pipe of claim 3, wherein the stop surface is continuous to form a wrap-around ring.

5. The pipe of claim 3, wherein the stop surface is formed by individual lugs in spaced-apart disposition about a circumference of the coupling collar.

6. The pipe of claim 1, wherein each of the coupling collars has an inner pipe portion distal end face and is provided at the inner pipe portion distal end face with a radially inwardly directed restraining surface.

7. The pipe of claim 6, wherein the restraining surface is continuous to form a ring-shaped member.

8. The pipe of claim 6, wherein the restraining surface is formed by plural restraining tabs in spaced-apart disposition about a circumference of the end face of the coupling collar.

9. The pipe of claim 6, wherein the end face of each of the coupling collars is grooved between the restraining surface and an outer surface of the coupling collar.

10. The pipe of claim 1, wherein the outer pipe portion has a wall which is traversed by at least one opening.

11. The pipe of claim 1, wherein each of the coupling collars is provided with a circumferential coupling groove.

12. The pipe of claim 1, wherein the coupling groove has a trapezoidal cross section.

13. The pipe of claim 1, wherein each of the coupling collars is provided with a radially projecting flange formed with a bore for connection of a further component.

14. A method of assembling an arcuate double-layer pipe, comprising the steps of:

inserting a rim-like projection of a first coupling collar into a pipe end of a first pipe portion;

welding the first coupling collar to the pipe end of the first pipe portion;

placing a second pipe portion into the first pipe portion until abutting an inner stop surface of the first coupling collar;

inserting a rim-like projection of a second coupling collar into another pipe end of the first pipe portion such as to overlap a confronting pipe end of the second pipe portion;

welding second first coupling collar to the other pipe end of the first pipe portion;

placing an insert in each of the first and second coupling collars; and securing the insert in place.

15. The method of claim 14, wherein the insert is secured by bending a restraining tab from an axial position to a radial position for abutment against a confronting end face of the insert.

16. The method of claim 14, and further comprising the step of introducing a pressure compensating layer through an opening in the first pipe portion into a gap between the first and second pipe portions.

* * * * *

UNITED STATES PATENT AND TRADEMARK OFFICE
CERTIFICATE OF CORRECTION

PATENT NO. : 6,520,213 B1
DATED : February 18, 2003
INVENTOR(S) : Alexander Esser It is certified that error appears in the above-identified patent and that said Letters Patent is hereby corrected as shown below:

<u>Title page,</u>
Insert Item: -- [30] Foreign Application Priority Date
September 4, 2001 ...............................101 43 290.9 --

Signed and Sealed this

Fifteenth Day of July, 2003

JAMES E. ROGAN
*Director of the United States Patent and Trademark Office*